United States Patent
Marques et al.

(10) Patent No.: US 12,501,912 B2
(45) Date of Patent: Dec. 23, 2025

(54) LOCKING DEVICE FOR PREVENTING FREEWHEELING OF AN AERATION FAN ROTOR

(71) Applicants: Al Marques, Swift Current (CA); James Braun, Herbert (CA)

(72) Inventors: Al Marques, Swift Current (CA); James Braun, Herbert (CA)

(73) Assignee: S3 Group Ltd., Calgary (CA)

( * ) Notice: Subject to any disclaimer, the term of this patent is extended or adjusted under 35 U.S.C. 154(b) by 908 days.

(21) Appl. No.: 17/668,999

(22) Filed: Feb. 10, 2022

(65) Prior Publication Data

US 2022/0338495 A1  Oct. 27, 2022

(30) Foreign Application Priority Data

Apr. 21, 2021  (CA) ................. CA 3115701

(51) Int. Cl.
*A23B 9/08*   (2006.01)
*A01F 25/22*  (2006.01)
(Continued)

(52) U.S. Cl.
CPC ............... *A23B 9/08* (2013.01); *A01F 25/22* (2013.01); *F04D 25/08* (2013.01); *F26B 9/063* (2013.01);
(Continued)

(58) Field of Classification Search
CPC . A23B 9/08; A01F 25/22; F04D 25/08; F26B 9/063; F26B 21/004; F26B 2200/06; F26B 21/001; F16D 41/26
See application file for complete search history.

(56) References Cited

U.S. PATENT DOCUMENTS 2,011,421 A * 8/1935 Searles ............... F24D 5/02
                                                    415/129
6,692,233 B2 * 2/2004 Liang ................. F04D 29/34
                                                    416/220 A
2009/0004014 A1 * 1/2009 Wang ................. F04D 25/08
                                                    416/210 R

FOREIGN PATENT DOCUMENTS

CN    107747552 A  *  3/2018
CN    108360905 A  *  8/2018   ............. A62B 31/00
(Continued)

OTHER PUBLICATIONS

Machine Translation of CN 107747552 A PDF File Name: "CN107747552A_Machine_Translation.pdf" (Year: 2018).*
(Continued)

*Primary Examiner* — Lindsay M Low
*Assistant Examiner* — Ruben Picon-Feliciano
(74) *Attorney, Agent, or Firm* — Thompson Hine LLP (57) ABSTRACT

A locking device for preventing freewheeling of an aeration fan rotor. The locking device comprises an elongated body having a predetermined length. The elongated body is adapted for being disposed through an opening of a fan housing containing the aeration fan rotor therein such that in a first position a first end portion of the elongated body is enabled to interact with the aeration fan rotor for preventing freewheeling of the aeration fan rotor and a second opposite end portion of the elongated body is placed outside the fan housing. The locking device further comprises means for holding the elongated body in the first position and a second position such that in the second position the first end portion of the elongated body is prevented from interacting with the aeration fan rotor.

14 Claims, 10 Drawing Sheets

(51) Int. Cl.
*F04D 25/08* (2006.01)
*F26B 9/06* (2006.01)
*F26B 21/00* (2006.01)

(52) U.S. Cl.
CPC ........ *F26B 21/004* (2013.01); *F26B 2200/06* (2013.01)

(56) References Cited

FOREIGN PATENT DOCUMENTS

| | | | | | |
|---|---|---|---|---|---|
| CN | 110486307 A | * | 11/2019 | | |
| CN | 111637073 A | * | 9/2020 | ............. | F04D 25/08 |

OTHER PUBLICATIONS

Machine Translation of CN 111637073 A PDF File Name: "CN111637073A_Machine_Translation.pdf" (Year: 2020).*
Machine Translation of CN 108360905 A PDF File Name: "CN108360905A_Machine_Translation.pdf" (Year: 2018).*
Machine Translation of CN 110486307 A PDF File Name: "CN110486307A_Machine_Translation.pdf" (Year: 2019).*

* cited by examiner

Figure 3 (Detail A)

Figure 7 (Section A-A)

Figure 8 (Detail B)

Figure 9        Figure 10

Figure 11 (Detail C)

Figure 15 (Section B-B)

LOCKING DEVICE FOR PREVENTING FREEWHEELING OF AN AERATION FAN ROTOR

This application claims priority to Canadian Patent Application Serial No. 3115701 filed on Apr. 21, 2021 and entitled Locking Device for Preventing Freewheeling of an Aeration Fan Rotor, the entire contents of which are hereby incorporated by reference.

FIELD

The present invention relates to aeration fans, and more particularly to a locking device for preventing freewheeling of an aeration fan rotor that is simple and easy to use.

BACKGROUND

Harvested grain such as, for example, wheat, rye, barley, canola, soybeans, and corn, is typically stored in storage bins—on site at a farm or commercial storage facilities—prior to distribution for processing or sale. Present-day agricultural storage bins are not only used for storing the grains therein, but also for assisting in drying, cooling, heating, and pest control by employing aeration thereto. Aeration fans supply air flow to the agricultural storage bins for drying, cooling, heating, and pest control.

Typically, the aeration fans are not continuously used but left idle for extended periods of time. Aeration fan rotors often freewheel when not in use and exposed to windy conditions. The freewheeling of the aeration fan rotors causes undue wear of the components of the aeration fan and, in particular, the electric motor driving the same, typically resulting in premature wear of the electric motor's rotary switch.

Presently, to prevent the freewheeling of the aeration fan rotor a plastic cover is inserted behind the air inlet screen to prevent air flow through the aeration fan chamber and spinning the aeration fan rotor. Unfortunately, installation and removal of the plastic cover requires the air inlet guard to be removed, or in some cases disassembly of the fan itself, thus causing a potential safety hazard by exposing the operator to the aeration fan rotor. Furthermore, the installation and removal of the plastic cover is time-consuming, generally resulting in the cover being removed and never reinstalled. Since there are many different sizes of aeration fan inlets employed depending on the fan type and size, many different cover sizes are needed.

It may be desirable to provide a locking device for preventing freewheeling of an aeration fan rotor that is easy, quick, and safe to use.

It also may be desirable to provide a locking device for preventing freewheeling of an aeration fan rotor that is simple and cost effective to manufacture.

It also may be desirable to provide a locking device for preventing freewheeling of an aeration fan rotor that is easy to install.

It also may be desirable to provide a locking device for preventing freewheeling of an aeration fan rotor that can be easily installed as a retrofit.

SUMMARY

Accordingly, in one embodiment one object of the present invention is to provide a locking device for preventing freewheeling of an aeration fan rotor that is easy, quick, and safe to use.

Another object of the present invention may be to provide a locking device for preventing freewheeling of an aeration fan rotor that is simple and cost effective to manufacture.

Another object of the present invention may be to provide a locking device for preventing freewheeling of an aeration fan rotor that is easy to install.

Another object of the present invention may be to provide a locking device for preventing freewheeling of an aeration fan rotor that can be easily installed as a retrofit.

According to one aspect of the present invention, there is provided a locking device for preventing freewheeling of an aeration fan rotor. The locking device comprises an elongated body having a predetermined length. The elongated body is adapted for being disposed through an opening of a fan housing containing the aeration fan rotor therein such that in a first position a first end portion of the elongated body is enabled to interact with the aeration fan rotor for preventing freewheeling of the aeration fan rotor and a second opposite end portion of the elongated body is placed outside the fan housing. The locking device further comprises means for holding the elongated body in the first position and a second position such that in the second position the first end portion of the elongated body is prevented from interacting with the aeration fan rotor.

According to one aspect of the present invention, there is provided a locking device for preventing freewheeling of an aeration fan rotor. The locking device comprises an elongated body having a predetermined length. The elongated body is adapted for being disposed through an opening of a fan housing containing the aeration fan rotor therein such that in a first position a first end portion of the elongated body is enabled to interact with the aeration fan rotor for preventing freewheeling of the aeration fan rotor and a second opposite end portion of the elongated body is placed outside the fan housing. The locking device further comprises first and second holding elements disposed at predetermined locations along the elongated body for holding the elongated body in the first position and a second position such that in the second position the first end portion of the elongated body is prevented from interacting with the aeration fan rotor.

According to one aspect of the present invention, there is provided a locking device for preventing freewheeling of an aeration fan rotor. The locking device comprises an elongated body having a predetermined length. The elongated body is adapted for being disposed through an opening of a fan housing containing the aeration fan rotor therein such that in a first position a first end portion of the elongated body is enabled to interact with the aeration fan rotor for preventing freewheeling of the aeration fan rotor and a second opposite end portion of the elongated body is placed outside the fan housing. The locking device further comprises means for holding the elongated body in the first position and a second position such that in the second position the first end portion of the elongated body is prevented from interacting with the aeration fan rotor. The elongated body is capable of resisting a force exerted by the aeration fan rotor thereon when the aeration fan rotor is in a freewheeling mode of operation while also being capable of flexing when the aeration fan rotor is in a driven mode of operation such that damage to the aeration fan rotor is prevented.

According to one aspect of the present invention, there is provided a locking device for preventing freewheeling of an aeration fan rotor. The locking device comprises an elongated body having a predetermined length. The elongated body is adapted for being disposed through an opening of a fan housing containing the aeration fan rotor therein such that in a first position a first end portion of the elongated body is enabled to interact with the aeration fan rotor for preventing freewheeling of the aeration fan rotor and a second opposite end portion of the elongated body is placed outside the fan housing. The locking device further comprises first and second holding elements disposed at predetermined locations along the elongated body for holding the elongated body in the first position and a second position such that in the second position the first end portion of the elongated body is prevented from interacting with the aeration fan rotor. The locking device further comprises a sleeve adapted for being inserted into the opening of the fan housing and affixed thereto. The sleeve comprises a guiding channel for guiding the elongated body during longitudinal movement therethrough. The sleeve further comprises interacting elements for interacting with the first and second holding elements.

According to one aspect of the present invention, there is provided an aeration fan. The aeration fan comprises a fan housing having an aeration fan rotor disposed therein. A drive mechanism is connected to the aeration fan rotor. The aeration fan further comprises a locking device for preventing freewheeling of the aeration fan rotor. The locking device comprises an elongated body having a predetermined length. The elongated body is adapted for being disposed through an opening of a fan housing containing the aeration fan rotor therein such that in a first position a first end portion of the elongated body is enabled to interact with the aeration fan rotor for preventing freewheeling of the aeration fan rotor and a second opposite end portion of the elongated body is placed outside the fan housing. The locking device further comprises means for holding the elongated body in the first position and a second position such that in the second position the first end portion of the elongated body is prevented from interacting with the aeration fan rotor.

An advantage of the present invention is that it provides a locking device for preventing freewheeling of an aeration fan rotor that is easy, quick, and safe to use.

A further advantage of the present invention is that it provides a locking device for preventing freewheeling of an aeration fan rotor that is simple and cost effective to manufacture.

A further advantage of the present invention is that it provides a locking device for preventing freewheeling of an aeration fan rotor that is easy to install.

A further advantage of the present invention is that it provides a locking device for preventing freewheeling of an aeration fan rotor that can be easily installed as a retrofit.

BRIEF DESCRIPTION OF THE DRAWINGS

An embodiment of the present invention is described below with reference to the accompanying drawings, in which.

DETAILED DESCRIPTION

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, certain methods and materials are now described.

While the description of the embodiments hereinbelow is with reference to a centrifugal aeration fan, it will become evident to those skilled in the art that the embodiments of the invention are not limited thereto, but are also adaptable for use with other types of aeration fans such as, for example, axial aeration fans and mixed airflow aeration fans.

Figure 1:
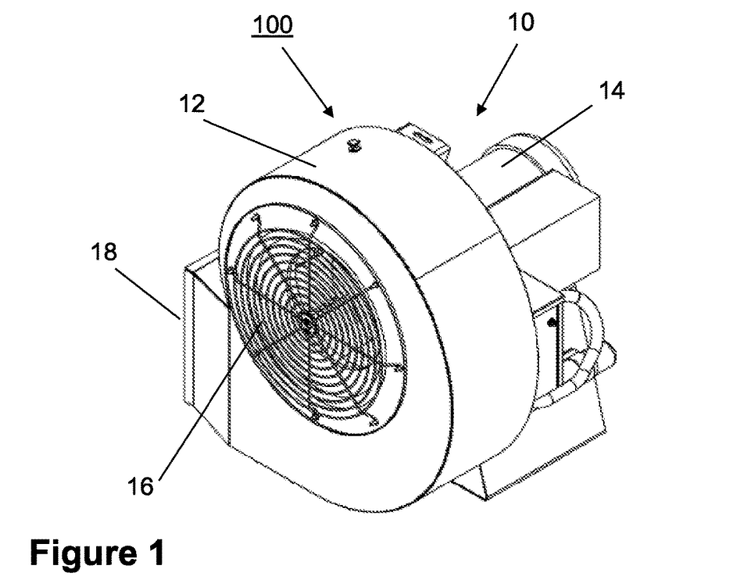
FIGS. 1 and 2 are simplified block diagrams illustrating in a perspective top view and a cross sectional view, respectively, an aeration fan comprising a locking device for preventing freewheeling of an aeration fan rotor according to an embodiment of the invention.
Figure 2:
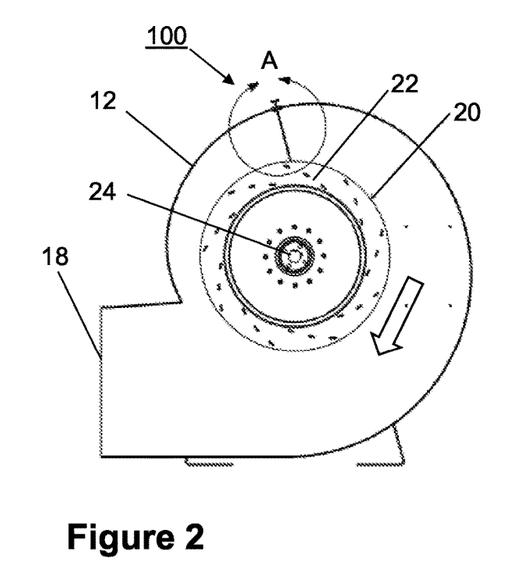
Figure 3:
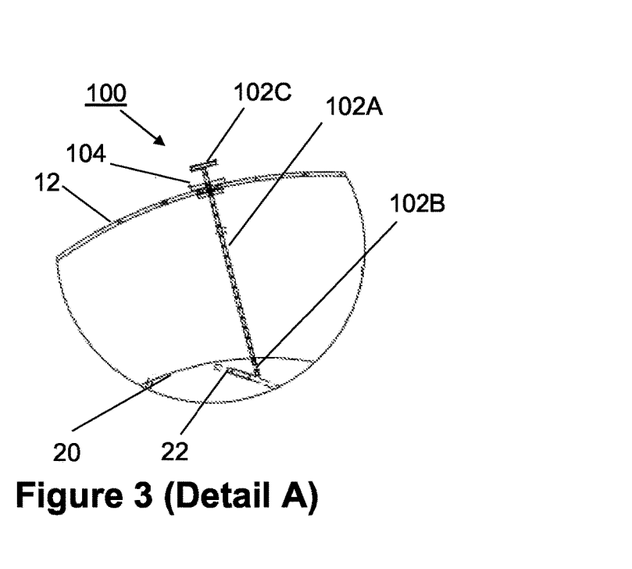
FIG. 3 is a simplified block diagram illustrating in a cross sectional view a detail of the aeration fan comprising the locking device for preventing freewheeling of an aeration fan rotor according to an embodiment of the invention.
Figures 4, 5, 6, 7, 8:
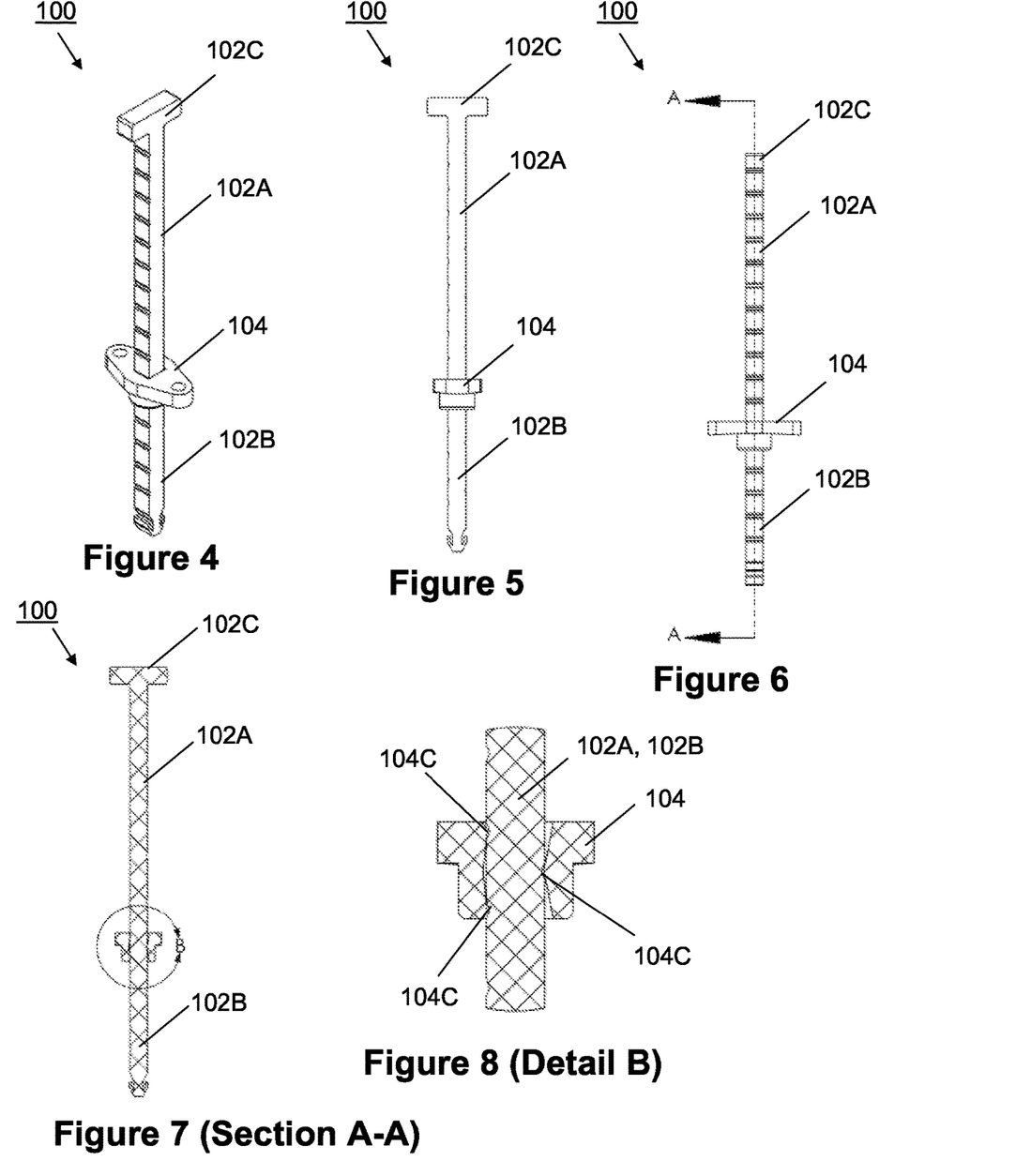
FIGS. 4, 5, 6, 7 and 8 are simplified block diagrams illustrating in a perspective top view, a first side view, a second side view, a cross sectional view, and a detailed cross sectional view, respectively, the locking device according to an embodiment of the invention.

Referring to FIGS. 1 to 16b a locking device 100 according to an embodiment of the invention is provided for preventing freewheeling of an aeration fan rotor. Fan rotors 20 often freewheel when the aeration fan 10 is not in use and exposed to windy conditions. Typically, when the aeration fan 10 is connected to a storage bin via output port 18 and is exposed to windy conditions when not in use an air flow enters the air inlet 16 and causes the aeration fan rotor 20 to rotate about axis 24, as indicated by the block arrow in FIG. 2.

The locking device 100 comprises an elongated locking body 102A having a predetermined length L. The elongated locking body 102A is disposed through an opening 12A of fan housing 12 of the aeration fan 10 containing the aeration fan rotor 20 therein such that in a first position a first end portion 102B of the elongated locking body 102A is enabled to interact with, for example, blade 22, of the aeration fan rotor 20 for preventing freewheeling of the aeration fan rotor 20, as illustrated in the detail in FIG. 3. A second opposite end portion of the elongated locking body 102A is placed outside the fan housing 12 and, in one case, connected to a handle 102C—such as, for example, a substantially flat rectangular bar oriented substantially perpendicular to the locking body 102A—for facilitating moving the same between the first position and a second position using simple push/pull action. The locking device 100 further comprises means for holding the elongated locking body 102A in the first position and a second position such that in the second position the first end portion 102B of the elongated locking body 102A is prevented from interacting with the aeration fan rotor 20 and, in one case, is placed in close proximity to the fan housing 12.

The locking device 100 can comprise first and second holding elements in the form of detents 102E.1 and 102E.2, respectively, disposed at predetermined locations along the elongated locking body 102A, as illustrated in FIGS. 4 to 11. The first and second holding elements can be adapted for interacting with respective interacting elements disposed in sleeve 104, as will be described hereinbelow. The first and second holding elements may be disposed at a plurality of locations along the elongated locking body 102A, thus allowing use of a same locking body 102A with different fan housings 12 requiring different lengths L of the locking body 102A. Optionally, a marker is disposed on the locking body 102A indicating the position to be used for a specific type of fan housing 12. Alternatively, each of the first and second holding elements are only disposed at a single location along the locking body 102A.

The locking body 102A can comprise a stopping element such as, for example, fins or hooks 102G, disposed at a first end 102D thereof. The fins or hooks 102G are adapted for interacting with the sleeve 104 when in contact therewith in order to prevent accidental removal of the locking body 102A from the aeration fan housing 12.

The locking device 100 can comprise a sleeve 104 adapted for being inserted into opening 12A of the fan housing 12 and affixed thereto, for example, using screw fasteners disposed in bores 104E, as illustrated in FIGS. 12 to 15. The sleeve 104 comprises, for example, a top sleeve portion 104A and a bottom sleeve portion 104D with the bottom sleeve portion 104D being adapted to pass through the opening 12A which has been, for example, drilled into the aeration fan housing 12.

Figure 9:
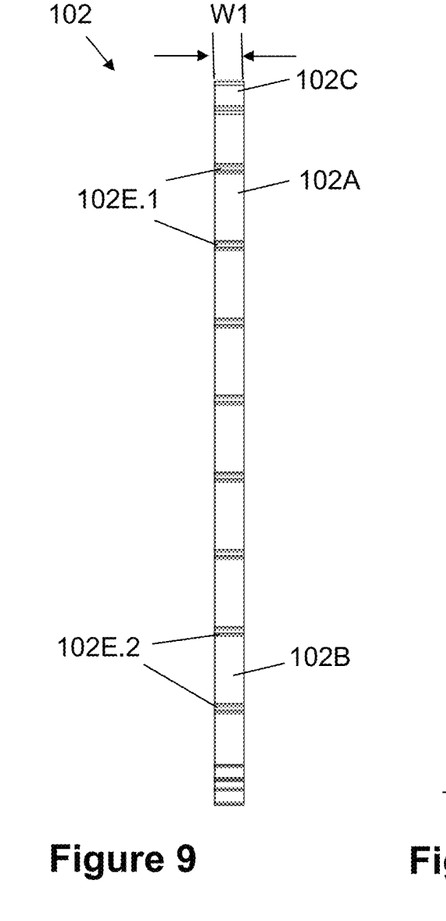
FIGS. 9, 10 and 11 are simplified block diagrams illustrating in a first side view, a second side view, and a detailed second side view, respectively, a locking body of the locking device according to an embodiment of the invention.
Figure 10:
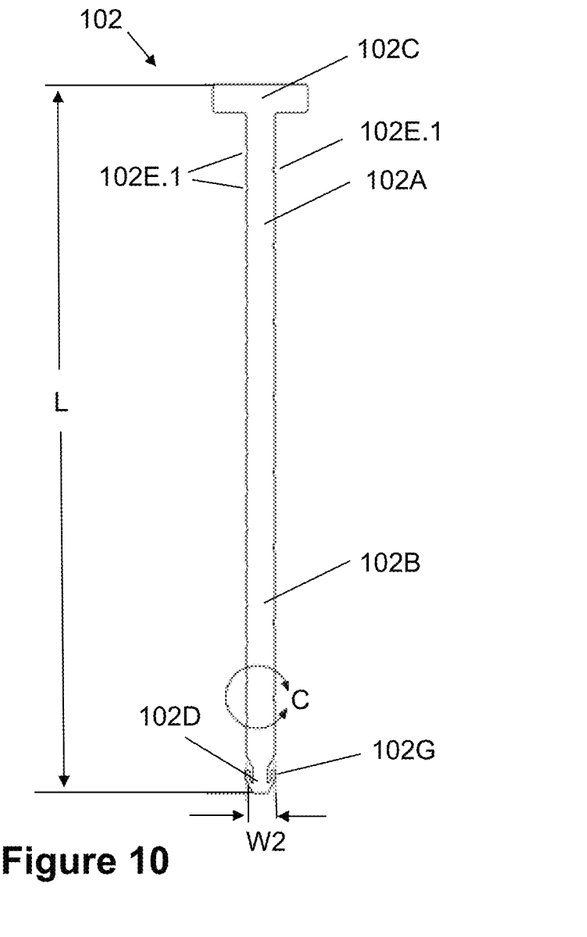
Figure 11:
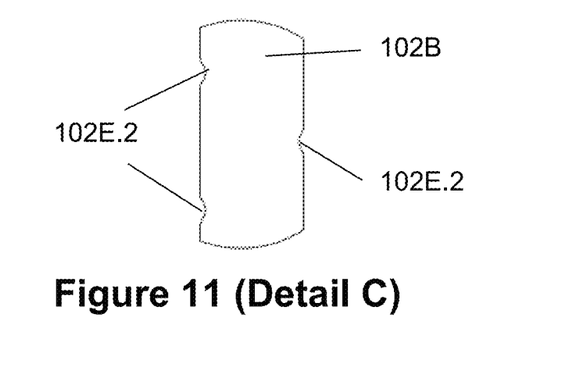
Figure 12:
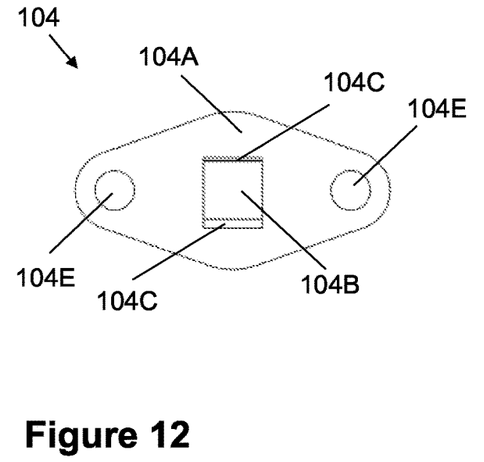
FIGS. 12, 13, 14 and 15 are simplified block diagrams illustrating in a top view, a perspective bottom view, a side view, and a cross sectional view, respectively, a sleeve of the locking device according to an embodiment of the invention.
Figure 13:
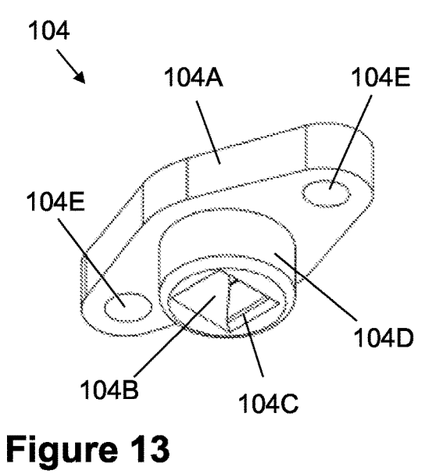
Figure 14:
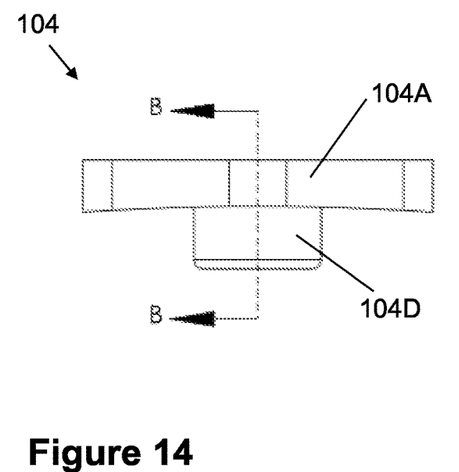
Figure 15:
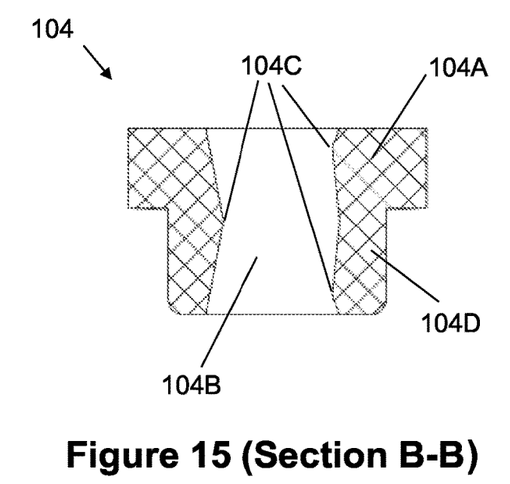

The sleeve 104 further comprises guiding channel 104B for guiding the locking body 102A during longitudinal movement therethrough. The guiding channel 104B is adapted for enabling movement of the locking body 102A therethrough. For example, the guiding channel 104B has a rectangular or square cross section for accommodating therein the respective locking body 102A having also a rectangular or square cross section of widths W1 and W2, as illustrated in FIGS. 9 and 10. Interacting elements 104C are disposed in the guiding channel 104B with the same having a curved shape corresponding to the detents 102E.1 and 102E.2 disposed on the locking body 102A for interacting with the same in order to hold the locking body 102A in one of the first and the second position, as well as for enabling movement of the locking body 102A through the guiding channel 104B when the same is pushed or pulled.

Alternatively, the sleeve 104 may be omitted, for example, by providing the opening 12A having a rectangular cross section adapted for guiding the locking body 102A therethrough as well as walls of the opening 12A being adapted for interacting with the detents for holding the locking body 102A in one of the first and second position.

Figure 16A:
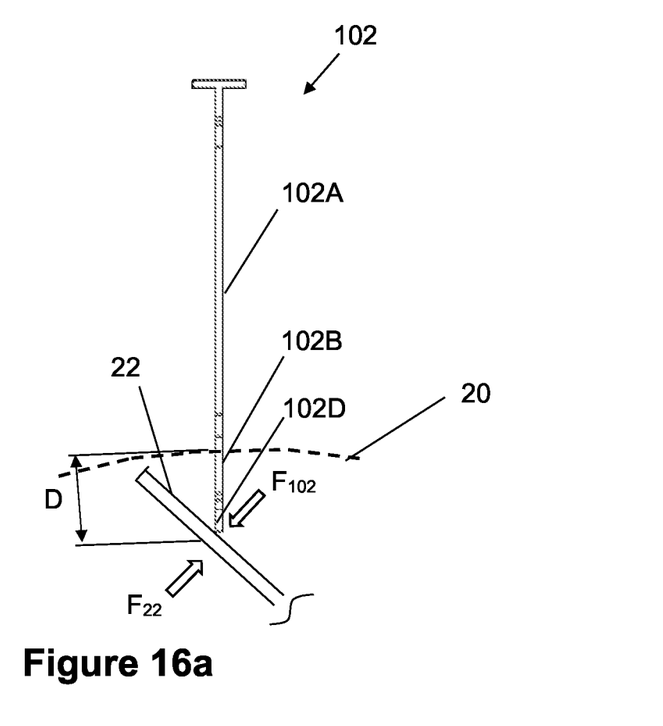
FIGS. 16a and 16b are simplified block diagrams illustrating in side views the locking body of the locking device according to an embodiment of the invention with locking body interacting with a blade of the aeration fan rotor.

The locking body 102A is adapted for providing force $F_{102}$ counteracting a relatively small force $F_{22}$ exerted by the blade 22 of the aeration fan rotor 20 thereon at distance D perpendicular to the circumference of the rotor 20 (dashed line in FIG. 16a)—for example, with D being in the range between 1 inch and 4 inches—when the aeration fan rotor 20 is in a freewheeling mode of operation and exposed to an incoming air flow, as indicated by the block arrows in FIG. 16a.

Figure 16B:
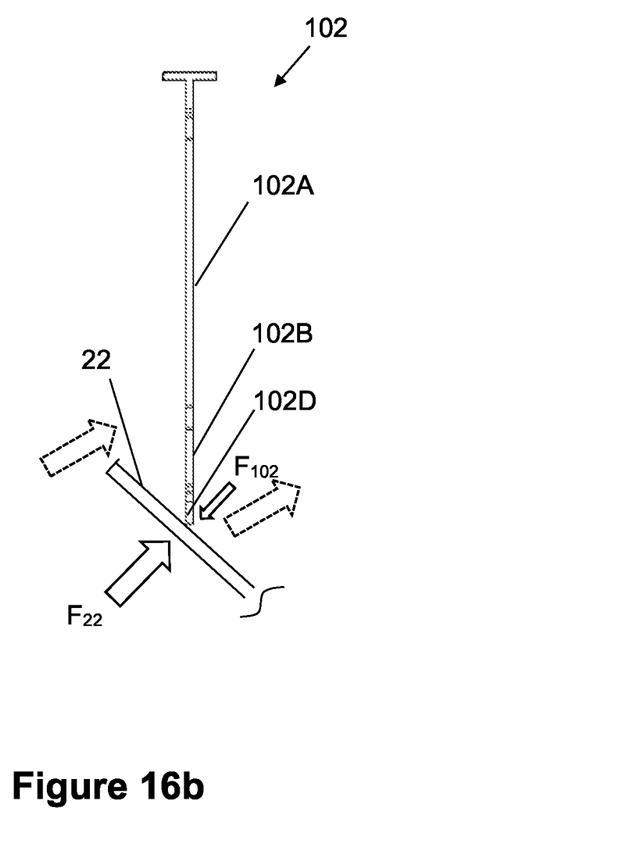
Figure 17:
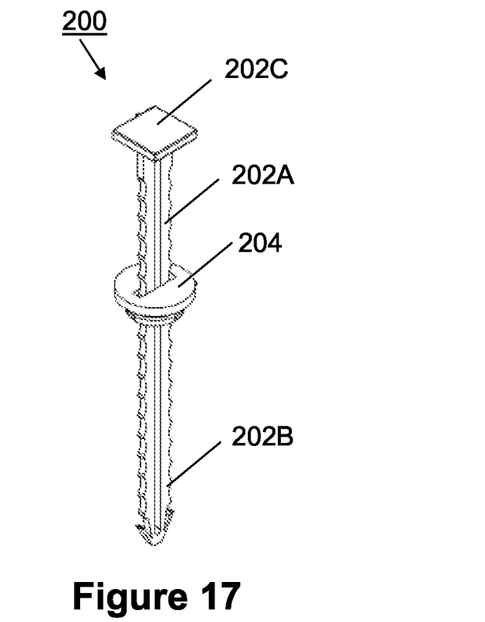
FIGS. 17 and 18 are simplified block diagrams illustrating in a perspective top view and a front view, respectively, the locking device according to another embodiment of the invention.
Figure 18:
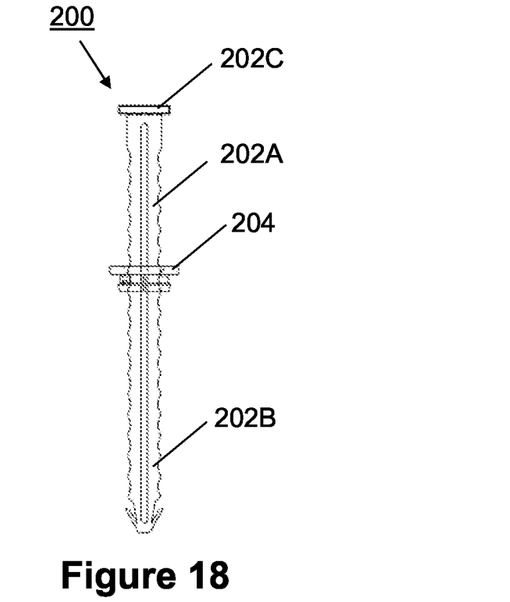
Figure 19:
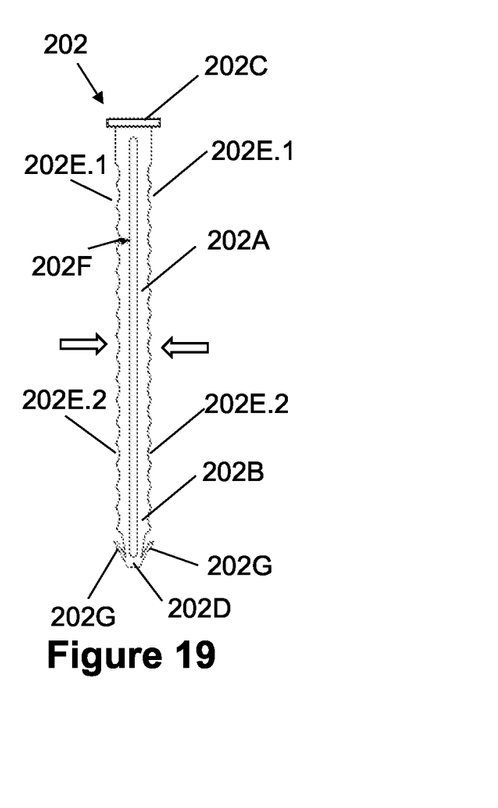
FIGS. 19 and 20 are simplified block diagrams illustrating in a front view and a side view, respectively, a locking body of the locking device according to another embodiment of the invention.
Figure 20:
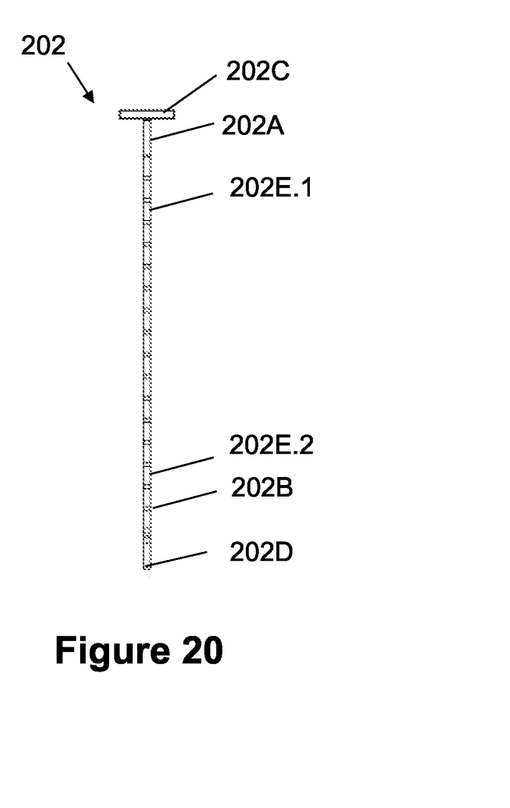
Figure 21:
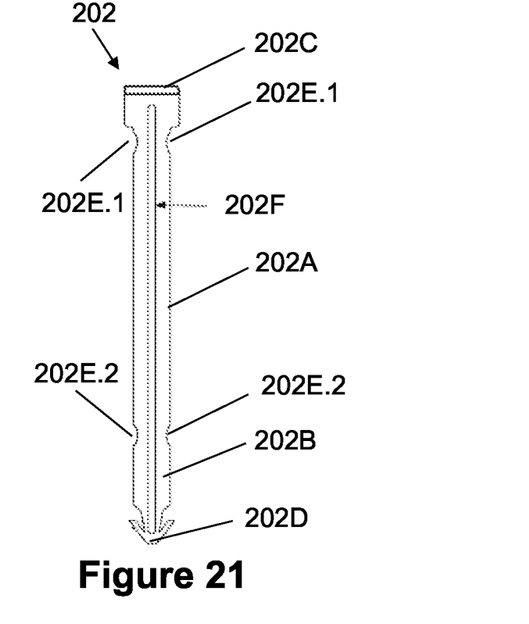
FIGS. 21 and 22 are simplified block diagrams illustrating in a front view and a side view, respectively, another locking body of the locking device according to another embodiment of the invention.
Figure 22:
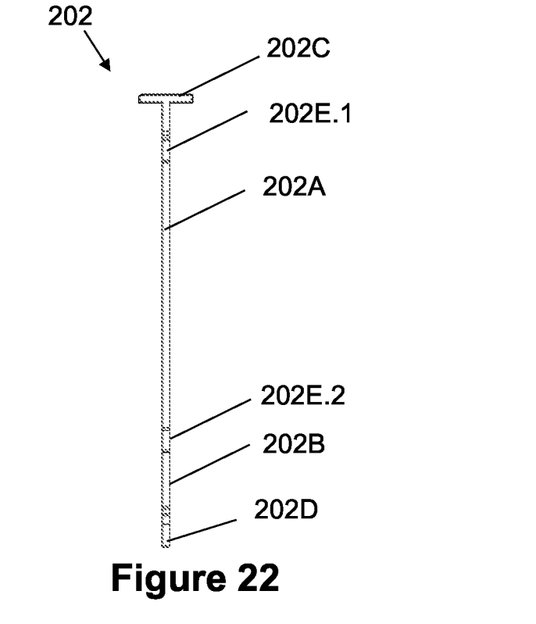

Furthermore, the locking body 102A is adapted for flexing when the blade 22 of the aeration fan rotor 20 exerts a larger force $F_{22}$ thereon, for example, when the drive mechanism 14 of the aeration fan rotor 20 is accidentally turned on while the locking body 102A is still in the first position, as indicated by the dashed block arrows in FIG. 16b. The flexing of the locking body 102A enables passage of the blade 22 thereby without causing damage to either the blade 22 or the locking body 102A. After passage of the blade 22, the locking body 102A snaps back and interacts with a following blade 22 causing a repetitious noise similar to a "hockey card in bicycle spokes," thus alerting the operator to shut the drive mechanism 14 off and to pull the locking body 102A into the second position.

Alternatively, if flexing of the locking body 102A is not desired the same is provided as a substantially rigid body that is designed to break off when the blade 22 of the aeration fan rotor 20 exerts a force $F_{22}$ that is larger than a predetermined threshold to prevent rotor damage in case the fan motor is started prior to the locking body being retracted.

The locking body 102A can have predetermined widths W1 and W2 with the widths W1 and W2 being approximately the same, as illustrated in FIGS. 9 and 10. The detents 102E.1 and 102E.2 can be disposed on two opposite sides of the locking body 102A, 102B in an alternating fashion and the sleeve 104 is adapted such that on one side two detents and on the opposite side one detent are in contact with the respective interacting elements 104C for properly securing the locking body 102 to the sleeve 104, as well as for facilitating moving of the locking body 102 by pulling or pushing the same.

In an example implementation the sleeve 104 and the locking body 102A are made in a simple and cost effective manner using a conventional polymer plastic material such as, for example, Nylon, and a conventional plastic moulding technique. The locking body 102A can have dimensions as follows: length L=9.375 inches; width W1=0.375 inch; and, width W2=0.375 inch.

Referring to FIGS. 17 to 29 a locking device 200 according to another embodiment of the invention is provided for preventing freewheeling of an aeration fan rotor. The locking device 200 comprises an elongated locking body 202A having a predetermined length L. The elongated locking body 202A is disposed through an opening 12A of fan housing 12 of the aeration fan 10 containing the aeration fan rotor 20 therein such that in a first position a first end portion 202B of the elongated locking body 202A is enabled to interact with, for example, blade 22, of the aeration fan rotor 20 for preventing freewheeling of the aeration fan rotor 20, as illustrated in the detail in FIG. 3. A second opposite end portion of the elongated locking body 202A is placed outside the fan housing 12 and, in one case, connected to a handle 202C—such as, for example, a substantially flat square shaped plate oriented substantially perpendicular to the locking body 202A—for facilitating moving the same between the first position and a second position using simple push/pull action. The locking device 200 further comprises means for holding the elongated locking body 202A in the first position and a second position such that in the second position the first end portion 202B of the elongated locking body 202A is prevented from interacting with the aeration fan rotor 20 and, in one case, is placed in close proximity to the fan housing 12.

The locking device 200 can comprise first and second holding elements in the form of detents 202E.1 and 202E.2, respectively, disposed at predetermined locations along the elongated locking body 202A, as illustrated in FIGS. 17 to 24. The first and second holding elements can be adapted for interacting with respective interacting elements disposed in sleeve 204, as will be described hereinbelow. The first and second holding elements may be disposed at a plurality of locations along the elongated locking body 202A, thus allowing use of a same locking body 202A with different fan housings 12 requiring different lengths L of the locking body 202A. Optionally, a marker is disposed on the locking body 202A indicating the position to be used for a specific type of fan housing 12. Alternatively, each of the first and second holding elements are only disposed at a single location along the locking body 202A.

The locking body 202A can comprise an elongated gap 202F disposed at a center of the locking body 202A and oriented substantially parallel thereto. The gap 202F provides flexibility for facilitating movement of the locking body 202A between the first and the second position, for example, facilitating movement through the sleeve 204 comprising respective interacting elements therein by enabling movement of the detents towards the center of the locking body 202A, as indicated by the block arrows in FIG. 19.

The locking device 200 can comprise a sleeve 204 adapted for being inserted into opening 12A of the fan housing 12 and affixed thereto, as illustrated in FIGS. 25 to 29. The sleeve 204 comprises, for example, a top sleeve portion 204A and a bottom sleeve portion 204D with the bottom sleeve portion 204D having gaps 204E disposed therein. The gaps 204E enable the separated sections of the bottom sleeve portion 204D to slightly move towards the center to allow lip 204F, disposed on the outside of the bottom sleeve portion 204D and surrounding the same, to pass through the opening 12A which has been, for example, drilled into the aeration fan housing 12, as indicated by the block arrows in FIG. 27a. After being passed through the opening 12A, the lip 204F secures the sleeve 204 to the housing 12, as illustrated in FIG. 27b. Therefore, the sleeve 204 is easily installed during manufacture of the aeration fan 10 or as a retro-fit of an existing aeration fan 10 by simply providing an opening 12A in the aeration fan housing 12 and placing the same inside the opening 12A in a snap-in fashion. Optionally, protrusion 204G is disposed on the bottom sleeve portion 204D for interacting with a wall of the opening 12A to prevent rotation of the sleeve 204 inside the opening 12A.

Figure 23:
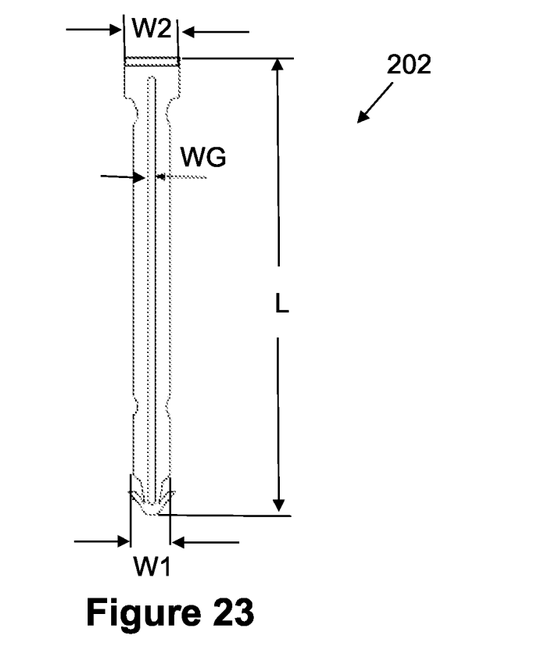
FIGS. 23 and 24 are simplified block diagrams illustrating in a front view and a side view, respectively, dimensions of the other locking body of the locking device according to another embodiment of the invention.
Figure 25:
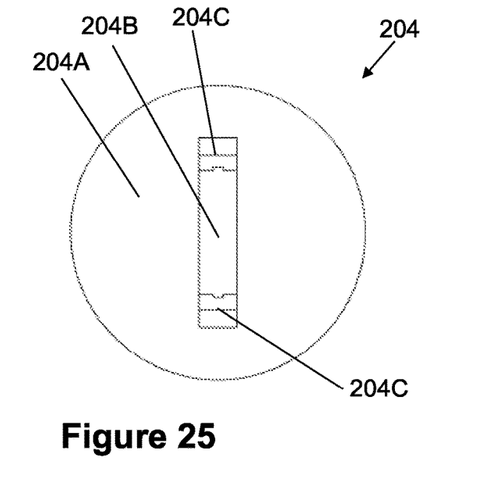
FIGS. 25 and 26 are simplified block diagrams illustrating in a top view and a side view, respectively, a sleeve of the locking device according to another embodiment of the invention.
Figure 26:
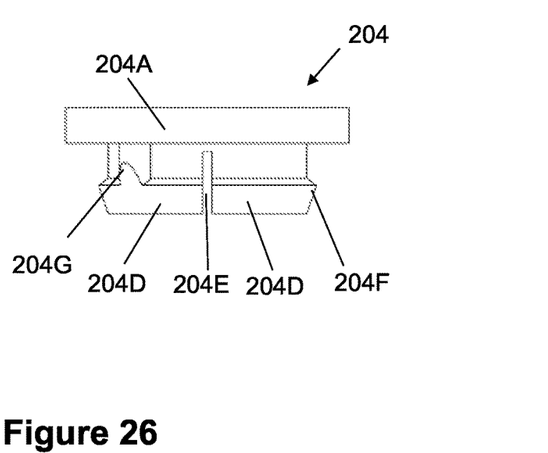
Figure 27A:
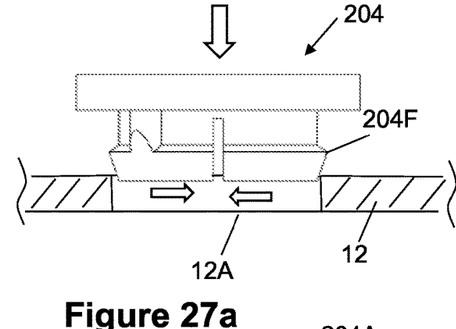
FIGS. 27a and 27b are simplified block diagrams illustrating in side views the sleeve of the locking device according to another embodiment of the invention before and after insertion into an opening of the fan housing.
Figure 27B:
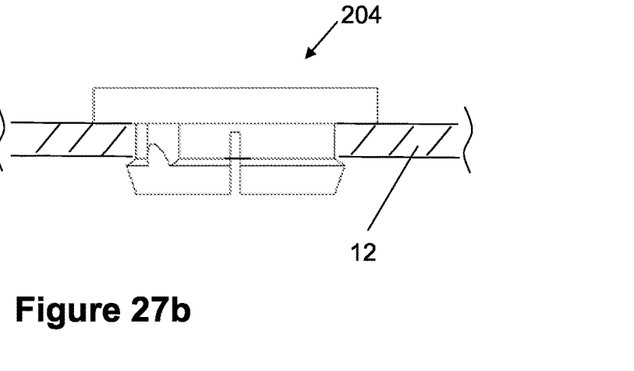
Figure 28:
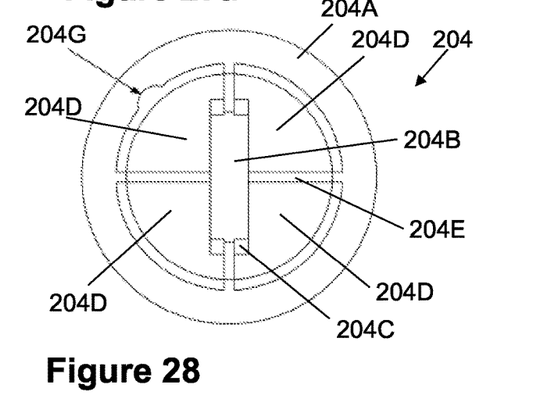
FIGS. 28 and 29 are simplified block diagrams illustrating in a top view and a cross sectional view, respectively, the sleeve of the locking device according to another embodiment of the invention.
Figure 29:
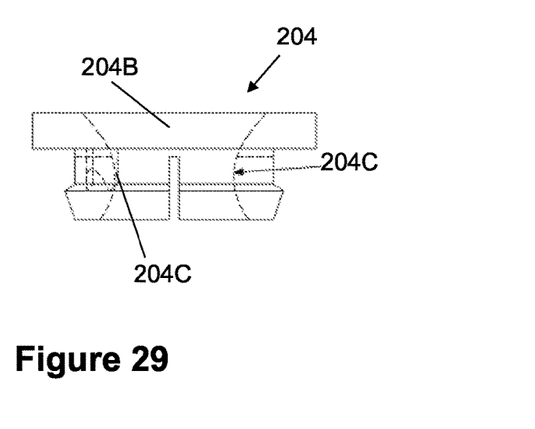

The sleeve 204 further comprises guiding channel 204B for guiding the locking body 202A during longitudinal movement therethrough. The guiding channel 204B is adapted for enabling movement of the locking body 202A therethrough. For example, the guiding channel 204B has a rectangular cross section for accommodating therein the respective locking body 202A having also a rectangular cross section of width W1 and thickness T, as illustrated in FIGS. 23 and 25. Interacting elements 204C are disposed in the guiding channel 204B with the same having a curved shape corresponding to the detents disposed on the locking body 202A for interacting with the same in order to hold the locking body 202A in one of the first and the second position, as well as for enabling movement of the locking body 202A through the guiding channel 204B when the same is pushed or pulled.

Figure 24:
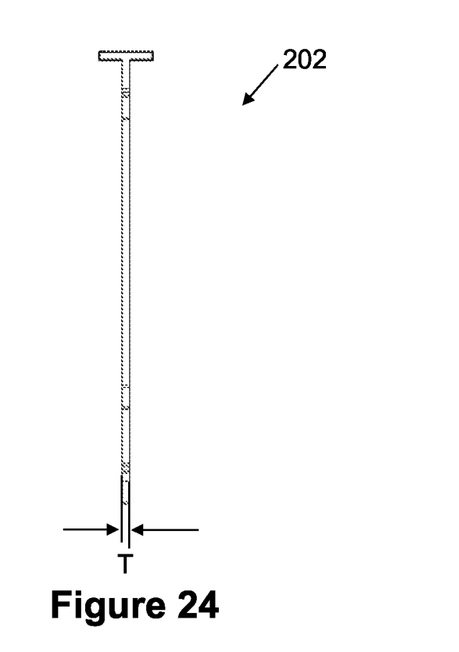

The locking body 202A can have a predetermined width W1 and thickness T with the width W1 being substantially larger than the thickness T, as illustrated in FIGS. 23 and 24, and is oriented such that a plane defined by the width W1 and the length L of the locking body 202A is oriented substantially parallel to a respective surface portion of a blade of the aeration fan rotor when interacting therewith.

In an example implementation the sleeve 204 and the locking body 202A are made in a simple and cost effective manner using a conventional polymer plastic material such as, for example, Nylon, and a conventional plastic moulding technique. The locking body 102A can have dimensions as follows: length L=9 inches; width W1=0.375 inch; width W2=0.75 inch; width WG=0.1 inch; and, thickness T=0.1 inch.

Figure 30:
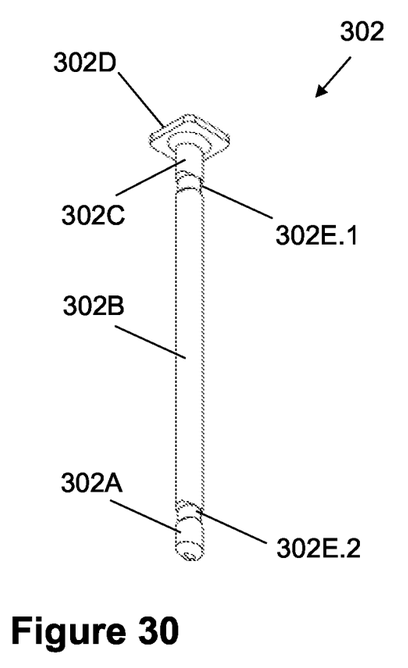
FIG. 30 is a simplified block diagram illustrating in a perspective bottom view a locking body of a locking device according to another embodiment of the invention; and, FIG. 31 is a simplified block diagram illustrating in a perspective top view a sleeve of the locking device according to another embodiment of the invention.
Figure 31:
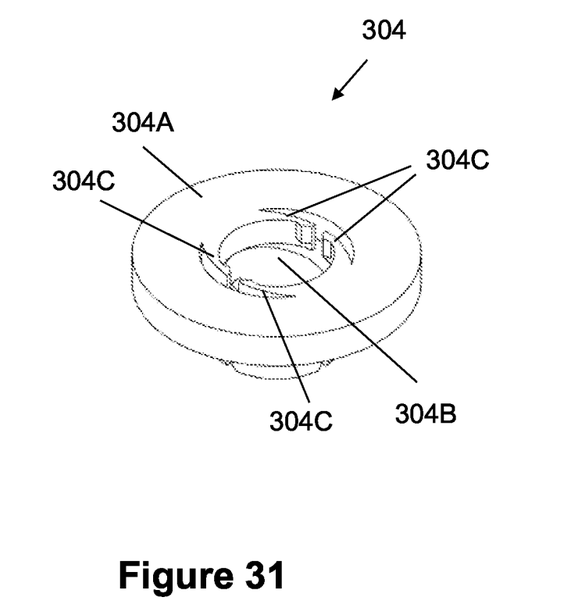

Referring to FIGS. 30 and 31 a locking device 300 according to yet another embodiment of the invention is provided for preventing freewheeling of an aeration fan rotor. The locking device 300 comprises locking body 302 having a bottom portion 302A, a middle portion 302B and top portion 302C with an oval shaped cross section. A first holding section 302E.1 having a smaller circular cross section for holding the locking body 302 in the first position is interposed between the middle portion 302B and the top portion 302C, while a second holding section 302E.2 having a smaller circular cross section for holding the locking body 302 in the second position is interposed between the bottom portion 302A and the middle portion 302B. Sleeve 304 is designed, for example, for providing snap-in functionality for installation similar to the sleeve 204 hereinabove. Guiding channel 304B is adapted for enabling longitudinal and twisting movement of the locking body 302 therethrough. Twist-lock elements 304C, disposed in top portion 304A of the sleeve 304, are adapted for interacting with the holding sections 302E.1 and 302E.2 in order to hold the locking body 302 in one of the first and the second position, while also being sufficiently flexible for enabling longitudinal movement of the locking body 302 between the first and the second position using twisting and pulling/pushing action exerted thereon via handle 302D.

Alternatively, the locking body may be provided having differently shaped cross sections, as well as differently shaped holding elements may be provided such as, for example, elements protruding from the locking body.

Further alternatively, the locking devices may be provided with a switch mechanism connected to a locking body such that provision of power to the drive mechanism 14 is interrupted when the locking body is in the first position, thus obviating provision of a locking body capable of flexing at the expense of a more complicated device.

Further alternatively, the locking devices may be provided with an actuator such as, for example, a magnetic mechanism for moving a locking body between the first and the second position such that locking body is moved into the second position prior provision of power to the drive mechanism 14 and back into the first position after shutting off the power to drive mechanism 14, thus obviating provision of a locking body capable of flexing at the expense of a more complicated device.

The present invention has been described herein with regard to certain embodiments. However, it will be obvious to persons skilled in the art that a number of variations and modifications can be made without departing from the scope of the invention as described herein.

What is claimed is:

1. A locking device for preventing freewheeling of an aeration fan rotor comprising:
    an elongated body having a predetermined length, the elongated body for being disposed through an opening of a fan housing containing the aeration fan rotor therein such that in a first position a first end portion of the elongated body is enabled to interact with the aeration fan rotor for preventing freewheeling of the aeration fan rotor and a second opposite end portion of the elongated body is placed outside the fan housing; and,
    means for holding the elongated body in the first position and a second position such that in the second position the first end portion of the elongated body is prevented from interacting with the aeration fan rotor,
    wherein the elongated body is capable of resisting a force exerted by the aeration fan rotor thereon when the aeration fan rotor is in a freewheeling mode of operation and wherein the elongated body is capable of flexing when the aeration fan rotor is in a driven mode of operation such that damage to the aeration fan rotor is prevented, and
    wherein the elongated body has a predetermined width and thickness with the width being larger than the thickness, and
    wherein the device is oriented such that a plane defined by the width and the length of the elongated body is oriented parallel to a respective surface portion of a blade of the aeration fan rotor when interacting therewith.

2. The locking device according to claim 1 wherein the means for holding the elongated body comprise first and second holding elements disposed at predetermined locations along the elongated body.

3. The locking device according to claim 2 wherein the first and second holding elements comprise detents disposed in the elongated body.

4. The locking device according to claim 2 comprising a sleeve adapted for being inserted into the opening of the fan housing and affixed thereto, the sleeve comprising a guiding channel for guiding the elongated body during longitudinal movement therethrough.

5. The locking device according to claim 4 wherein the sleeve comprises interacting elements for interacting with the first and second holding elements.

6. The locking device according to claim 4 wherein the elongated body comprises a stopping element disposed at a first end thereof, the stopping element being adapted for interacting with the sleeve stopping removal of the elongated body.

7. The locking device according to claim 1 wherein the elongated body comprises an elongated gap disposed at a center of the elongated body and oriented parallel thereto.

8. The locking device according to claim 1 wherein a plurality of first holding elements is disposed at a plurality of different predetermined locations along the elongated body.

9. The locking device according to claim 1 wherein the means for holding the elongated body includes at least one of a detent, or a groove or a protruding element.

10. An aeration fan comprising:
    a fan housing;
    an aeration fan rotor disposed in the fan housing;
    a drive mechanism connected to the aeration fan rotor; and,
    a locking device for preventing freewheeling of the aeration fan rotor comprising:
        an elongated body having a predetermined length, the elongated body for being disposed through an opening of the fan housing such that in a first position a first end portion of the elongated body is enabled to interact with the aeration fan rotor for preventing freewheeling of the aeration fan rotor and a second opposite end portion of the elongated body is placed outside the fan housing; and,
        means for holding the elongated body in the first position and a second position such that in the second position the first end portion of the elongated body is prevented from interacting with the aeration fan rotor;
    wherein the elongated body is capable of resisting a force exerted by the aeration fan rotor thereon when the aeration fan rotor is in a freewheeling mode of operation and wherein the elongated body is capable of flexing when the aeration fan rotor is in a driven mode of operation such that damage to the aeration fan rotor is prevented,
    wherein the elongated body has a predetermined width and thickness with the width being larger than the thickness, and
    wherein the device is oriented such that a plane defined by the width and the length of the elongated body is oriented parallel to a respective surface portion of a blade of the aeration fan rotor when interacting therewith.

11. The aeration fan according to claim 10 wherein the means for holding the elongated body comprise first and second holding elements disposed at predetermined locations along the elongated body.

12. The aeration fan according to claim 11 comprising a sleeve adapted for being inserted into the opening of the fan housing and affixed thereto, the sleeve comprising a guiding channel for guiding the elongated body during longitudinal movement therethrough.

13. The locking device according to claim 10 wherein the means for holding the elongated body includes at least one of a detent, or a groove or a protruding element.

14. A locking device for preventing freewheeling of an aeration fan rotor comprising:
    an elongated body having a predetermined length, the elongated body for being disposed through an opening of a fan housing containing the aeration fan rotor therein such that in a first position a first end portion of the elongated body is enabled to interact with the aeration fan rotor for preventing freewheeling of the aeration fan rotor and a second opposite end portion of the elongated body is placed outside the fan housing;

first and second holding elements disposed at predetermined locations along the elongated body for holding the elongated body in the first position and a second position such that in the second position the first end portion of the elongated body is prevented from interacting with the aeration fan rotor; and, a sleeve adapted for being inserted into the opening of the fan housing and affixed thereto, the sleeve comprising a guiding channel for guiding the elongated body during longitudinal movement therethrough, wherein the sleeve comprises interacting elements for interacting with the first and second holding elements.

* * * * *